Jan. 6, 1959    NOBUYOSHI KAWANO    2,867,352
NON-SPLATTER COVERED SKILLET
Filed Jan. 5, 1956    2 Sheets-Sheet 1
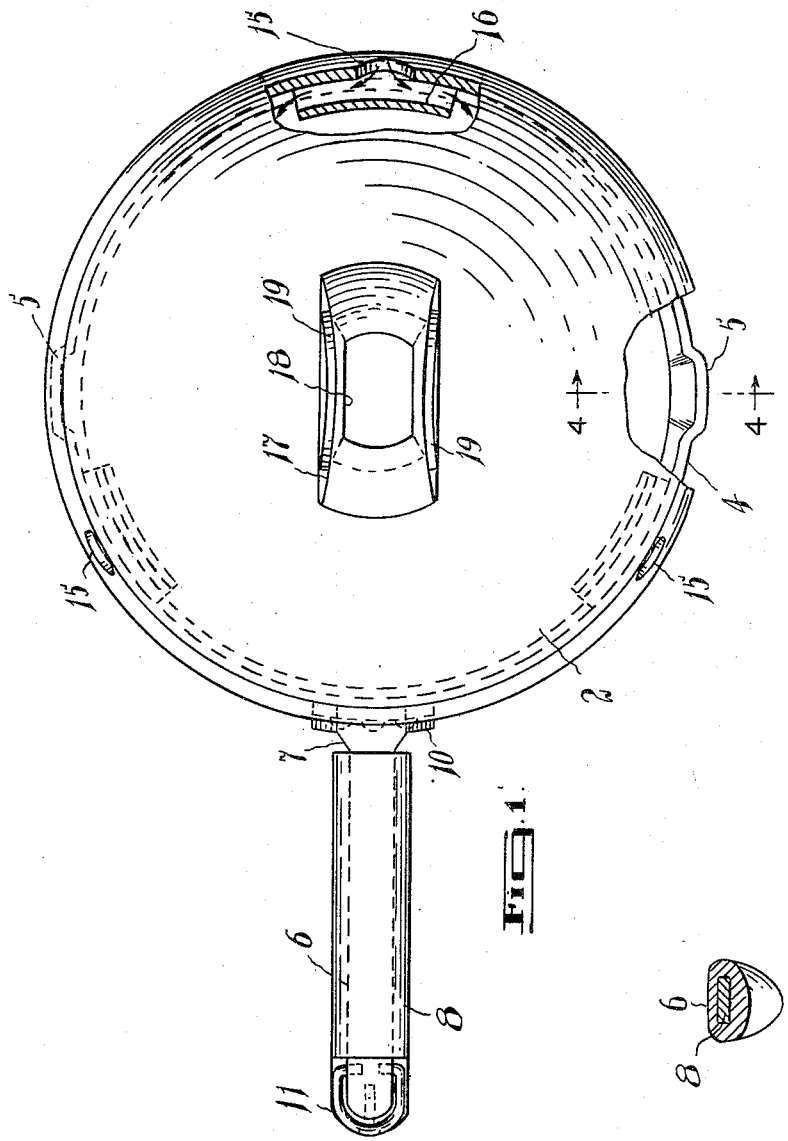
INVENTOR
NOBUYOSHI KAWANO
By Frederick C. Bromley
ATTY.

Jan. 6, 1959  NOBUYOSHI KAWANO  2,867,352
NON-SPLATTER COVERED SKILLET
Filed Jan. 5, 1956  2 Sheets-Sheet 2
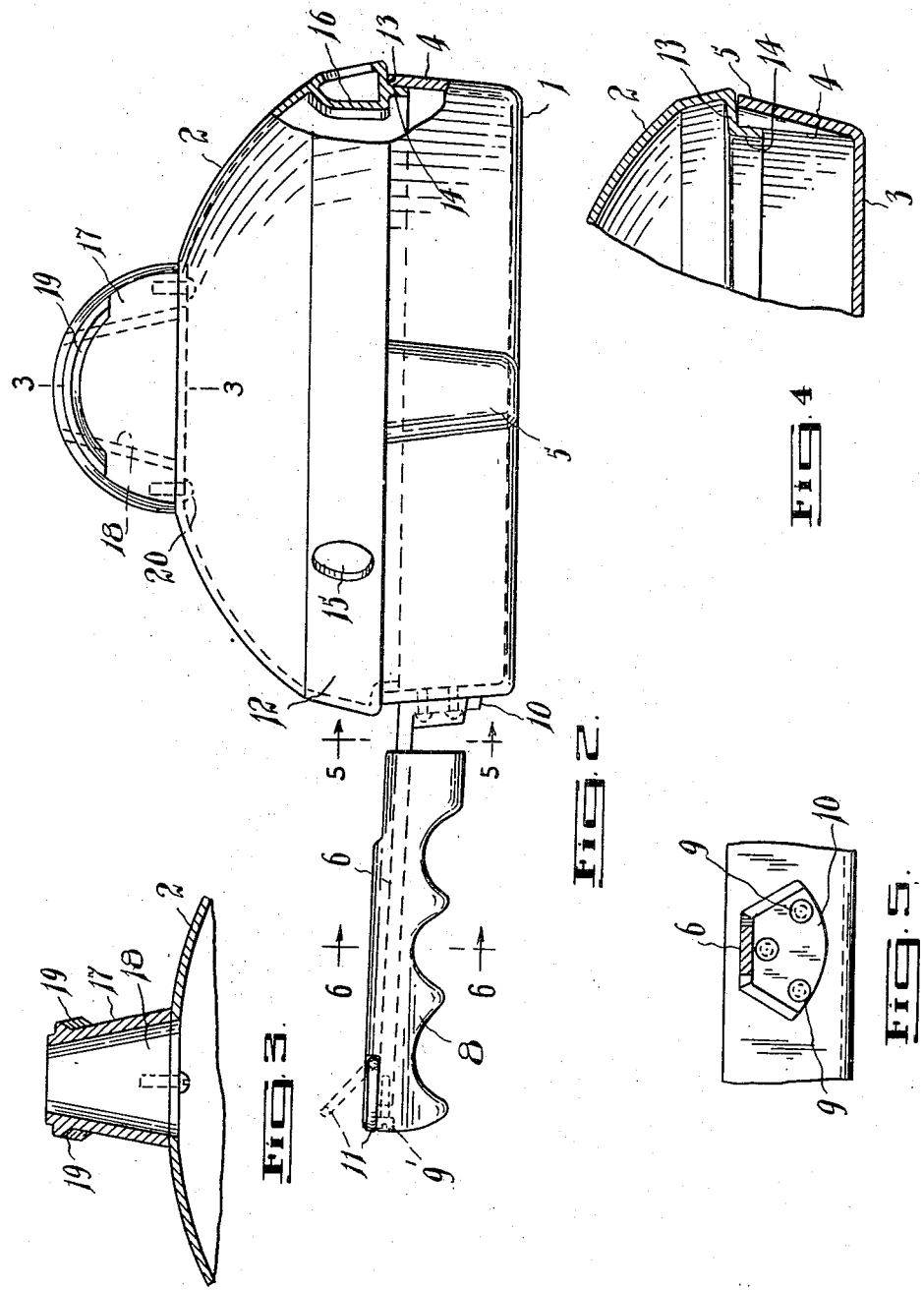
INVENTOR
NOBUYOSHI KAWANO

United States Patent Office 2,867,352
Patented Jan. 6, 1959

2,867,352

NON-SPLATTER COVERED SKILLET

Nobuyoshi Kawano, Toronto, Ontario, Canada

Application January 5, 1956, Serial No. 557,611

1 Claim. (Cl. 220—44)

My invention relates to skillets and has for its general object to provide a non-splatter covered skillet having salient features of construction.

A paramount object of the invention is to produce a skillet of this type in which there is provided a plurality of spaced holes around the skirt portion of the lid which serve as intake openings for admission of air during cooking and in which there is provided a central vent opening at the top of the lid which co-operates with the intake openings aforesaid, whereby to generally prevent steaming and more particularly to assure of steam rising through the centre vent. According to the arrangement, air is circulated through the intake holes and emanates from the central vent opening.

A highly desirable feature of the construction is that each intake hole is provided with a baffle wall disposed behind it in spaced relation so as to provide an intervening passage for air circulation transversely with respect to the intake hole and in both directions with regard to the ends of the passage.

The arrangement is such that spattering is obviated. Accordingly when cooking with oil there is no tendency to splash oil on the stove, nor on the floor or walls of the room in which the stove is located.

The construction also prevents undesirable steaming when frying. Moreover, less cooking time is required and natural food flavours are retained in the cooking process.

These and other desirable advantages are attained, one of which is that meats when cooked in a skillet incorporating the invention are inclined to be more tender.

A further object of the invention is to provide a skillet of the kind referred to in which the top of the lid is supplied with a grasping element in the nature of a handle, which is apertured to provide the vent opening.

A still further feature of the invention is that the baffle walls are vertically arranged and joined to the skirt portion of the lid at their upper and lower parts, the juncture of the lower part being formed by a ledge wall which seats the lid on the pan-body.

A still further feature is that the pan is desirably supplied with two pouring lips, one at each side, which make pouring easy, for which purpose there is supplied a handle. When not in use the skillet may be suspended from its handle by the provision of a ring which is normally seated in a recess in the end of the handle so as not to interfere with the grasping of the grip part of the handle.

Having described the general objects of the invention, reference will now be made to a selected embodiment of the invention which is recounted in the ensuing specification and shown in the accompanying drawings forming a part thereof.

In the drawings Fig. 1 is a top of a skillet constructed in accordance with my invention;

Fig. 2 is a side elevation thereof;

Fig. 3 is a sectional detail of the lid taken on line 3—3 of Fig. 2;

Fig. 4 is a fragmentary section on line 4—4 of Fig. 1;

Fig. 5 is a cross section on line 5—5 of Fig. 2; and

Fig. 6 is a section on line 6—6 of Fig. 2.

My invention is embodied in a skillet in which the pan, generally indicated at 1, is covered by a separate and distinct lid, generally indicated at 2. The pan comprises a body made up as usual of a bottom wall 3 and a circumscribing side wall 4. The pan body is shallow and is supplied desirably with two diametrically opposite pouring lips 5 fashioned in the side wall 4 which facilitates pouring. The pan body is shown as equipped with a handle 6, which handle is formed with a tang member 7 inserted in a grasping member 8 made of a suitable material. The grasping member may be secured as by a screw, indicated at 9', or otherwise according to dictates of manufacture.

The tang is shown as riveted to the side wall of the pan-body by means of rivets 9 placed in a spatula end-part of the tang.

A ring 11 is desirably placed on the outer end of the handle with the purpose of hanging the skillet from a hook when not in use. The ring is normally disposed in a recess so that it does not project and interfere in the normal use of the handle. When required the ring can be swung outwardly, as indicated by the dotted lines, Fig. 2.

The lid is a dome-like member having a skirt portion indicated at 12. The skirt has a ledge-forming wall 13 which extends inwardly and enables the lid to be seated firmly on the side wall of the pan. The ledging wall 13 is a circular member horizontally arranged and provided at its inner edge with a depending retaining wall 14, which engages the side wall of the pan and precludes displacement of the lid.

In the skirt portion 12 there is provided a plurality of inlet openings, designated 15. The openings 15 are equidistantly spaced and preferably there are three in number. Each of the openings is provided with an interiorly disposed baffle wall 16. The baffle walls are located behind the openings and are spaced inwardly thereof. The spacing provides a passage intervening the corresponding aperture and the passage communicates at its ends with the interior free space of the lid as well as with the opening. Accordingly, the baffles function to preclude splashing.

Whereas the openings provide for air circulation, admitted air passes through the passage into the interior of the lid. It will be noted that each baffle wall is joined at its bottom to the ledge-forming wall 13 and is joined at its top to the skirt portion of the lid. Its side edges are free. Consequently, each end of the transverse passage is open to the interior of the lid whereby a free communication is provided with the ambient atmosphere by means of the opening and the passage.

Desirably, the floor of the passage may slope inwardly so that hot grease cannot collect in the passage but will be caused to drain into the pan.

The central top portion of the lid is supplied with a grasping member 17 in the form of a handle, which is apertured to provide an upwardly extending opening 18 serving as a vent. Desirably, this opening is funnel-shaped as shown. The grasping element 17 is rounded and has at its sides arcuate finger grips 19. The grasping element may be attached by screws 20, or other suitable fastening means.

A vent opening co-operates with the admission openings in the skirt portion by which the pan is centered thereby establishing a system of circulation for air so that steaming is obviated as well as splattering.

The invention provides a sturdy and serviceable skillet structure which is inexpensive to manufacture.

It is to be understood that such changes and modifications may be resorted to as coming within the scope of the invention as defined in the subjoined claim.

What I claim is:

In a covered skillet a lid for a pan having a circular side wall, said lid comprising a dome-shaped body downwardly terminating in a skirt portion of a diameter at least equal to the side wall of said pan, said skirt portion provided with inlet openings at intervals therearound, a horizontal ledge-forming wall integrated with said skirt portion and co-extensive therewith, said ledge-forming wall projecting inwardly of said skirt portion to seat on said side wall and having an inner edge portion, a retaining wall of a circular extent depending from said ledge-forming wall at said inner edge portion for engaging said side wall for precluding displacement of the lid when the lid is placed on the pan, and vertical baffle walls disposed interiorly of said lid in spaced relation to said skirt portion thereof, each baffle wall located behind an inlet opening in said skirt portion and providing an intervening passage communicating at its ends with the free space within the lid, each baffle wall joined at its lower end to said ledge-forming wall and having a juncture at its upper end with said skirt portion over and above the respective inlet opening.

References Cited in the file of this patent

UNITED STATES PATENTS

| | | |
|---|---|---|
| 2,559,196 | Medved | July 3, 1951 |
| 2,686,608 | Rock | Aug. 17, 1954 |
| 2,751,901 | Livermore | June 26, 1956 |